(12) United States Patent
Gemmer et al.

(10) Patent No.: US 8,902,889 B2
(45) Date of Patent: Dec. 2, 2014

(54) METHOD, COMMUNICATION ARRANGEMENT AND COMMUNICATION DEVICE FOR TRANSFERRING INFORMATION

(75) Inventors: Thomas Gemmer, München (DE); Thomas Treyer, München (DE)

(73) Assignee: Siemens Aktiengesellschaft, Munich (DE)

(*) Notice: Subject to any disclaimer, the term of this patent is extended or adjusted under 35 U.S.C. 154(b) by 1435 days.

(21) Appl. No.: 11/990,643

(22) PCT Filed: Aug. 14, 2006

(86) PCT No.: PCT/EP2006/065283
§ 371 (c)(1),
(2), (4) Date: Feb. 19, 2008

(87) PCT Pub. No.: WO2007/020253
PCT Pub. Date: Feb. 22, 2007

(65) Prior Publication Data
US 2009/0190584 A1    Jul. 30, 2009

(30) Foreign Application Priority Data
Aug. 16, 2005   (DE) .................. 10 2005 038 690

(51) Int. Cl.
*H04L 12/28* (2006.01)
*H04Q 11/04* (2006.01)

(52) U.S. Cl.
CPC ..... *H04Q 11/04* (2013.01); *H04Q 2213/13107* (2013.01); *H04Q 2213/13389* (2013.01); *H04Q 2213/13202* (2013.01); *H04Q 2213/13204* (2013.01); *H04Q 2213/13242* (2013.01); *H04L 12/2859* (2013.01); *H04L 12/2881* (2013.01); *H04Q 2213/13298* (2013.01); *H04Q 2213/13039* (2013.01)
USPC .................... 370/390; 370/395.2; 709/242

(58) Field of Classification Search
USPC .......... 370/352, 395.2; 709/242, 243; 725/38, 725/105
See application file for complete search history.

(56) References Cited

U.S. PATENT DOCUMENTS 6,654,371 B1    11/2003 Dunstan et al.
7,606,186 B2 *  10/2009 Hundscheidt et al. ........ 370/312
(Continued)

FOREIGN PATENT DOCUMENTS

| | | |
|---|---|---|
| CN | 1592487 | 3/2005 |
| DE | 100 60 123 | 6/2002 |
| EP | 1 492 381 | 12/2004 |

OTHER PUBLICATIONS

Cisco Systems, Inc., "Delivering Multicast Video Over Asymmetric Digital Subscriber Line", Cisco White Paper, 1999, pp. 1-14.
(Continued)

*Primary Examiner* — Kan Yuen
(74) *Attorney, Agent, or Firm* — Staas & Halsey LLP

(57) ABSTRACT

A method transfers information from and/or to a subscriber-sided communication device wherein at least one first communication relationship between the subscriber-sided communication device and a decentralized communication device which is associated with at least one communication network is established. Also, at least one additional communication relationship between the central communication device and a network access communication network is established. First information can be exchanged between the subscriber-sided communication device and the superior communication network via the first and the at least one additional communication relationship. Additional information which is transferred via the at least one communication network to the decentralized communication device is transferred via the first communication relationship to the subscriber-sided communication device. Advantageously, traditional subscriber-sided communication devices and network-sided network access devices and multimedia-data sources can still be used for using current and future multimedia-data services.

13 Claims, 5 Drawing Sheets

(56) References Cited

U.S. PATENT DOCUMENTS

| | | | |
|---|---|---|---|
| 7,633,893 B2* | 12/2009 | Grindahl et al. | 370/315 |
| 2003/0053458 A1 | 3/2003 | Okazaki | |
| 2004/0004965 A1* | 1/2004 | Chen et al. | 370/395.2 |
| 2004/0034716 A1* | 2/2004 | Sundarraj et al. | 709/242 |
| 2004/0165586 A1 | 8/2004 | Read et al. | |
| 2004/0264443 A1 | 12/2004 | Back et al. | |
| 2005/0028206 A1* | 2/2005 | Cameron et al. | 725/46 |
| 2005/0152370 A1 | 7/2005 | Meehan et al. | |
| 2005/0163166 A1 | 7/2005 | Ying et al. | |
| 2005/0276283 A1* | 12/2005 | Gyselings et al. | 370/537 |
| 2006/0182109 A1* | 8/2006 | Melsen et al. | 370/390 |
| 2008/0080537 A1* | 4/2008 | Wan et al. | 370/401 |
| 2008/0130633 A1* | 6/2008 | Ying et al. | 370/352 |
| 2009/0154466 A1* | 6/2009 | Townsley et al. | 370/395.1 |
| 2010/0322235 A1* | 12/2010 | Mehta et al. | 370/352 |

OTHER PUBLICATIONS

English translation of Korean Office Action issued Feb. 20, 2013 for Korean Application No. 10-2008-7006328.

* cited by examiner

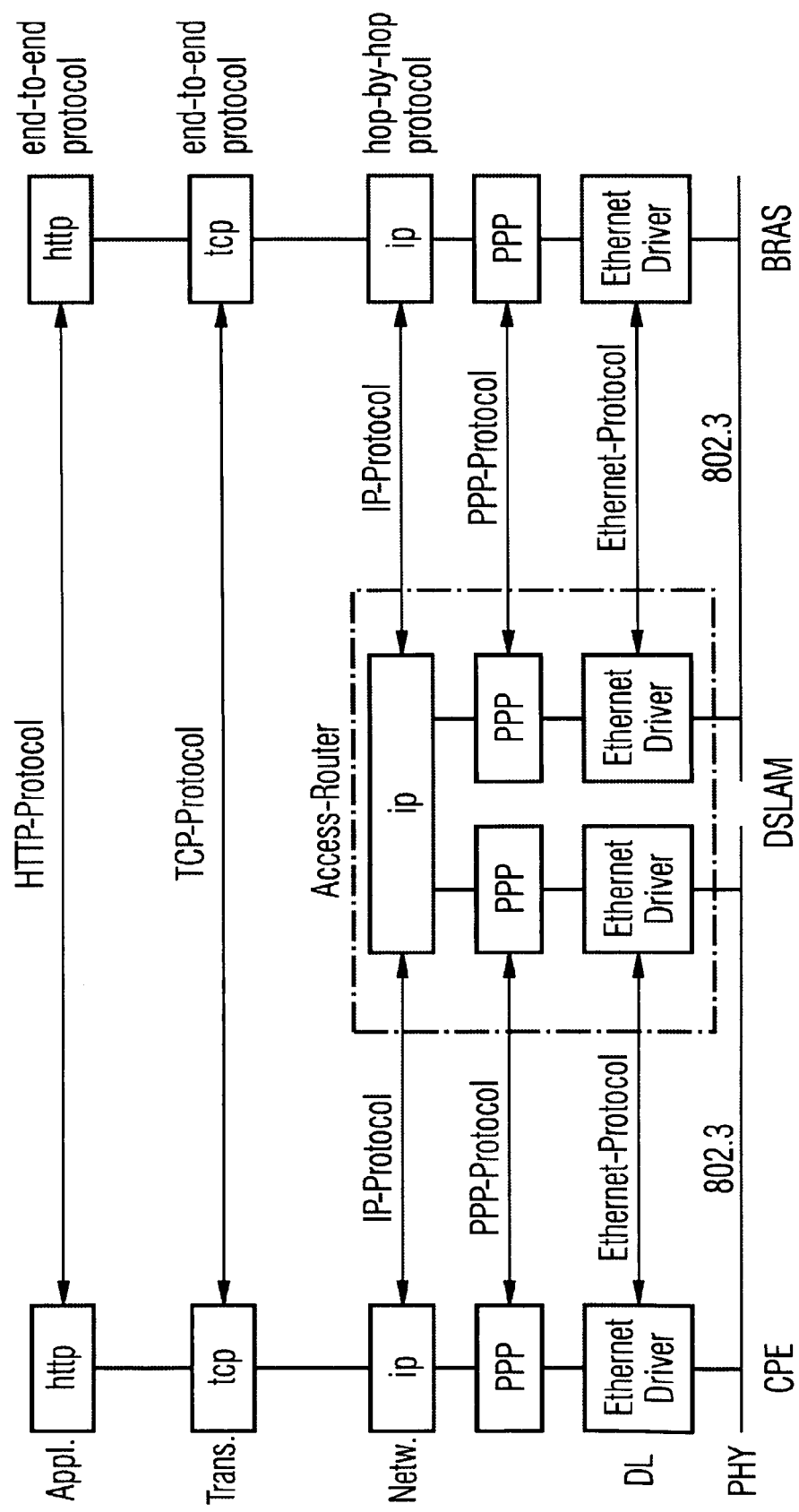

METHOD, COMMUNICATION ARRANGEMENT AND COMMUNICATION DEVICE FOR TRANSFERRING INFORMATION

CROSS REFERENCE TO RELATED APPLICATIONS

This application is based on and hereby claims priority to German Application No. 10 2005 038 690.3 filed on Aug. 16, 2005 and PCT Application No. PCT/EP2006/065283 filed on Aug. 14, 2006, the contents of which are hereby incorporated by reference.

BACKGROUND OF THE INVENTION

In today's subscriber access networks—also referred to simply as access networks, increasingly wide use is being made of the subscriber access, embodied for example in accordance with an xDSL transmission method and providing high transmission rates. The broadband Internet access which such a device typically allows will mean a continuing increase in applications provided by these subscriber access networks. One of these applications is the transmission of information with multimedia content—also referred to as broadband multimedia data streams—such as videos or video streams for example. Broadband distribution services, especially multimedia distribution services (e.g. radio and television) as well as on-demand services such as "video-on-demand" or broadband Internet communication (e.g. video conferencing) can be implemented with the aid of these applications for example.

Broadcasting services such as multicasting will increasingly be employed for the transfer of broadband multimedia data streams via communication networks. Multicast—also referred to as IP multicast in communication networks embodied according to the Internet Protocol IP—enables a plurality of recipients to be supplied simultaneously with multimedia data, over the Internet or over another communication network, if necessary in real time as well, without imposing too great a load on servers, routers or the network. Within the framework of multicast there can be any number of recipients which also do not have to be known to the sender. All recipients belonging to a group of interested parties are grouped together under a group address. The sender sends the data only once to this address. For the recipients the data is only multiplexed by those routers at which there are branches in the network structure. This keeps the volume of data to be transmitted smaller since no unnecessary packets will be sent. In addition the load will be relieved on the network and the performance of servers and routers improved. IP multicast is cost effective, especially with transmission services such as multimedia streaming.

The membership of the group is administered in IP networks within the framework of the Internet Group Management Protocol or IGMP. With the Internet Group Management Protocol IP hosts divide up their multicast membership between adjacent multicast routers. In this context a router can also appear as a host, with the group membership of the connected hosts then being combined and reported by the router to a higher-ranking network as a single group membership. IGMP is viewed as a component of the Internet Protocol since a normal IP packet is generated here too containing IGMP information (protocol elements) in its information field.

The Ethernet transmission method is widespread in the subscriber access network, with access being subject to certain general conditions in such networks. For example the user must be able to sign on and be authenticated in an operating system-independent manner; in addition billing information generally has to be recorded. This service feature has been realized for dial-in nodes with the Point-To-Point Protocol (PPP) and the associated radius protocol. The clear solution was thus to expand the procedures and protocols introduced in this area to broadband access, which eventually led to the introduction of "PPP over Ethernet (PPPoE)".

In current subscriber access networks a plurality of users (hosts) are connected for example via xDSL modems to a decentralized communication device or multiplexer device (also referred to as a Digital Subscriber Line Access Multiplexer, DSLAM). In other variants the communication device is implemented for example by an active or passive optical distribution network (AON or PON). The information transferred from the subscribers to the DSLAM is transmitted over a connected communication network—also as referred to as an aggregation network—to a broadband Network Access Server (NAS) or Broadband Remote Access Server (BRAS), the first node, operating at the IP level and usually dealing together with a management network server (radius server) with the tasks of authentication, billing etc. Current subscriber access networks embodied in accordance with xDSL transmission technology operate with ATM (Asynchronous Transfer Mode) as their layer-2 protocol. In the future however, direct Ethernet transmission technology will increasingly be used here as the layer-2 technology. The Network Access Server is mostly also linked into the ATM or Ethernet communication network. An adaptation layer or PPPoE protocol layer arranged in the NAS makes sure that PPP can be transmitted over Ethernet.

PPPoE along with PPPoA is practically a de-facto standard for broadband Internet access. The request for setting up a connection to the Internet—i.e. initialization of a PPPoE-session—is made by the user (PPPoE), with the request being processed by a Broadband Remote Access Server (BRAS) in its role as PPPoE server. One PPPoE session per user is required, with an individual BRAS being able to process up to 50,000 sessions or communication relationships. PPPoE is however only suitable for point-to-point relationships. This was sufficient in most applications, since current accesses to the Internet are mostly based on Unicast data traffic. For innovative services such as Internet TV or Broadcast over DSL this point-to-point topology proves to be a disadvantage. This will be illustrated by an example: In a subscriber access network, 100 TV channels are offered to the subscribers for selection, with a bandwidth of 2 Megabits per second being required for each TV channel. An individual BRAS can process around 50,000 subscribers, i.e. at maximum load 50,000 PPPoE connections or sessions must be processed simultaneously. If each subscriber requests a specific TV channel the BRAS must insert 50,000 TV channels into 50,000 PPPoE connections. This requires a bandwidth of around 100 Gigabits per second. Since PPPoE is based on a point-to-point connection, a BRAS cannot profit from the fact that only 100 different TV channels, i.e. 100 different types of information have to be processed. In the worst case, in which all subscribers request one and the same TV channel, this means that this one requested TV channel still has to be inserted 50,000 times by the BRAS into the 50,000 PPPoE sessions. The result is not only an enormous waste of bandwidth by the BRAS, but also a waste of bandwidth in respect of the network resources available in the aggregation network between BRAS and the respective DSLAM.

To overcome the above problems, as a first measure the capacity of the BRAS and also of the subscriber access network can be embodied such that the complex multicast distribution can be controlled via the BRAS. This solution however involves a high level of technical and thereby also of financial outlay.

A second solution would be the relocation of the multicast distribution point from the respective video source (e.g. video server or head end) to the respective DSLAM. A consequence of this would be that in the DSLAM, as well as the existing PPPoE session between subscriber and BRAS, a further connection for transmission of the multicast data traffic has to be configured over the individual subscriber line. The problem which arises here however is that most of the communication devices arranged on the subscriber side (personal computer, router, set top box) cannot process a plurality of parallel connections or sessions. Thus for example two sessions conducted simultaneously require two different IP addresses—but neither the current subscriber side communication devices or CPEs (Customer Promises Equipment) nor the DSL routers are embodied to operate with a plurality of equal-ranking IP addresses.

There would be the theoretical option of terminating the PPPoE session in the subscriber-side communication device (for example a NAT, Network Address Translation) router as well as terminating the multicast session in a TV set top box connected to the NAT router. This however would make it necessary for the NAT router to "tunnel through" the multicast session to the TV set top box, which involves greater outlay. The 2-session approach thus has the following disadvantages:

The subscriber-side communication device must be equipped with "tunnel attributes",
Separate cabling is required between the subscriber-side communication device and the set top box for example,
The connection of further set top boxes is very complicated,
The set top box cannot be used as an Internet access for Internet-compliant applications such as the EPG (Electronic Program Guide) or Internet telephony (VoIP) for example,
A personal computer or laptop cannot be employed for utilization of TV channels,
At least two public IP addresses are required for each household.

An ADSL access network with improved authentication, authorization, billing control and configuration control for multicast services is described in European application EP 1 398 910 A1.

An XDSL device, multicast distribution system and data distribution method are described in American application US 2003/0053458 A1.

SUMMARY

A potential object is thus to optimize the transmission of information over subscriber access networks.

With the proposed method for transmitting information from and/or to a subscriber-side communication device at least one first communication relationship between the subscriber-side communication device and a decentralized communication device assigned to at least one communication network is configured. Furthermore at least one further communication relationship is set up between the decentralized communication device and a network access device implementing the connection to a higher-ranking communication network, with first information between the subscriber-side communication device and the higher-ranking communication network being exchanged via the at least one first and the at least one further communication relationship. Further information transferred via the at least one communication network to the decentralized communication device is transferred to the subscriber-side communication device in addition to the first information about the at least one first communication relationship.

The major advantage of the method proposed by the inventors lies in the fact that different types of data traffic such as multicast data traffic and bidirectional PPPoE data traffic for example (such as for example Internet data traffic) are able to be transferred over one and the same communication relationship or session between decentralized communication device and subscriber. This enables commercially-available subscriber-side communication devices designed for processing a session, such as current retail routers, to continue to be used for utilization of current information services and future services still to be introduced.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows an arrangement of the protocol layers (protocol stack) for executing the proposed method in accordance with a first embodiment variant.

DETAILED DESCRIPTION OF THE PREFERRED EMBODIMENT

Figure 1A:
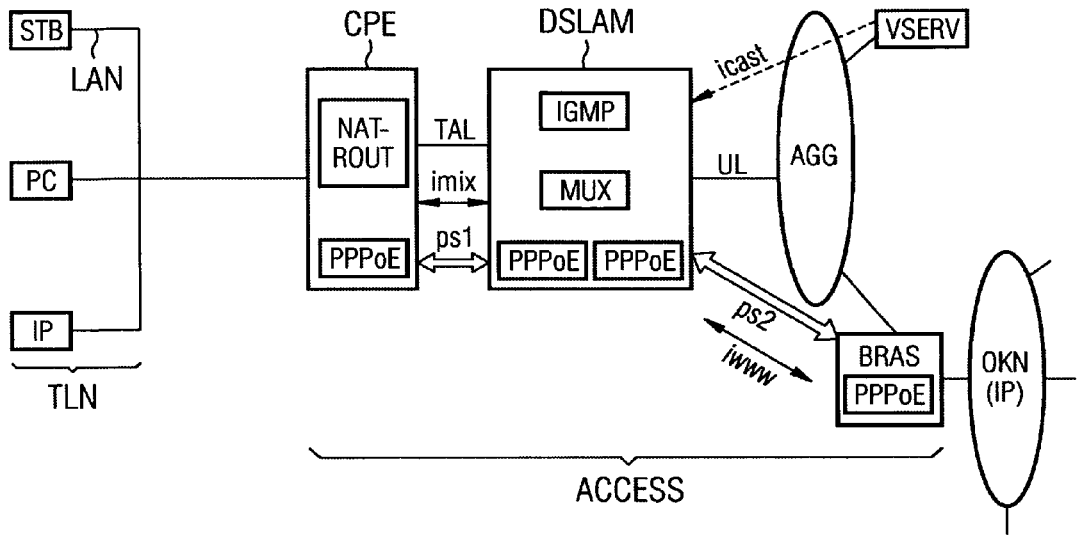
FIG. 1 shows typical application scenarios for executing the proposed method

Reference will now be made in detail to the preferred embodiments of the present invention, examples of which are illustrated in the accompanying drawings, wherein like reference numerals refer to like elements throughout.

Figure 1B:
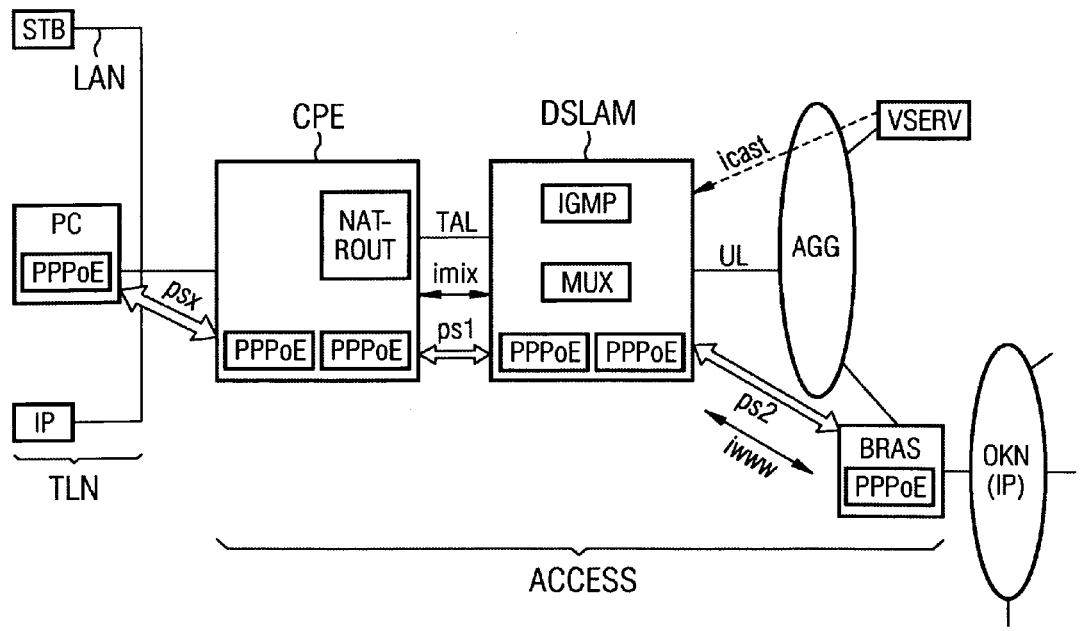

FIG. 1 shows a block diagram of a decentralized communication device arranged in a subscriber access network ACCESS—also referred to below as a DSLAM, Digital Subscriber Line Access Multiplexer—to which Customer Premises Equipment CPE is connected via a subscriber access line TAL. Just a single item of customer premises equipment CPE, connected via a subscriber line TAL, represents a plurality of said items in FIG. 1. The customer premises equipment CPE in this exemplary embodiment is embodied as an xDSL modem with assigned NAT router functionality NAT-ROUT. A local area network LAN is connected to the xDSL modem CPE via which a plurality of communication terminals such as a set top box STB, a personal computer PC as well as an Internet-enabled telephone IP are connected to the xDSL modem. The DSLAM is connected via an uplink UL and an aggregation network AGG to both a video server VSERV arranged in the subscriber access network ACCESS as well as to an access device or BRAS, likewise arranged in the subscriber access network. Access to a higher-ranking communication network such as the Internet for example is provided for the relevant subscriber-side communication terminals STB, PC, IP by the BRAS.

There are a plurality of protocol instances PPPoE in the DSLAM for termination of the PPP or PPPoE protocol or session. Within the framework of the method a first PPPoE session ps1 is set up between the decentralized communication device DSLAM and the customer premises equipment CPE. Furthermore a second PPPoE session ps2 is set up between the decentralized communication device DSLAM and the BRAS. Within the framework of the method the decentralized communication device DSLAM assumes the role of a "man-in-the middle", which remains invisible to the subscriber and also to the respective Internet service providers operating the BRASs. Advantageously the two PPPoE sessions ps1, 2 are linked in the decentralized communication device DSLAM such that data packets (e.g. Network Control Protocol or NCP data packets) are passed on transparently from one session to the other in a manner in which only one end-to-end session is outwardly visible at the outer end points of the individual sessions ps1, 2. The effect of this is that, if the first PPPoE session ps1 is cleared down, the second PPPoE session ps2 is also automatically cleared down.

The transparent linkage is embodied such that for example, for an establishment of a PPPoE session in the direction of the BRAS initiated by the subscriber, the first PPPoE session ps1 is set up between subscriber or CPE and the decentralized communication device DSLAM and the first password and account information transferred via this PPPoE session is captured by the decentralized communication device DSLAM. The password and account information will also be used by the decentralized communication device DSLAM to set up the second PPPoE session ps2 to the respective BRAS.

Since the "man-in-the-middle" functionality implemented by the decentralized communication device DSLAM is transparent to the outside world, commercially-available communication devices such as modems, routers and BRAS servers can continue to be used. It is assumed for further embodiments that the subscriber has set up both a connection to the Internet (surfing the Internet by PC) and has also requested specific multimedia information by a set top box STB.

Within the framework of current multimedia services such as IPTV or video-on-demand for example, the corresponding multimedia information icast such as e.g. MPEG datastreams is transferred by broadcast or multicast from the video server VSERV via the aggregation network AGG assigned to the subscriber access network Access to the decentralized communication device DSLAM. In addition bidirectional Internet data traffic iwww is transferred via the BRAS and via the second PPPoE session ps2 to the decentralized communication device DKE. The information relevant for a subscriber, icast, iwww, is selected, multiplexed and the multiplexed data stream imux is transmitted via the first PPPoE session ps1 to the subscriber TLN in each case via a multiplexer MUX arranged in the decentralized communication device DSLAM. The multiplexed data stream imix thus transmitted to the customer premises equipment CPE of the subscriber TLN is forwarded by the NAT router functionality NAT_ROUT arranged in the customer premises equipment CPE to the relevant connected terminal STB, PC, IP via the LAN.

The combination or multiplexing of Internet data traffic iwww and multicast data streams icast in the decentralized communication device DSLAM and transmission of this merged data stream imix via the PPPoE session ps1 to the subscriber enables a simple and thus advantageous arrangement structure of the home network or LAN arranged in the subscriber area. By transferring all requested information icast, iwww via this one PPPoE session ps1, all the problems of the "2-session approach" mentioned in the introduction to the description are resolved or removed. Thus for example requested TV channels can be viewed on both the television connected to the set top box and also via the personal computer or laptop connected via the LAN to the customer premises equipment CPE. Only the use of a public IP address is required for the local area network LAN. This is allocated within the framework of the usual procedures during setup of the PPPoE connections ps1, 2 between CPE and BRAS—for example within the framework of the IPCP protocol, which was introduced as the Network Control Protocol (NCP) for IP. The advantageous use of an NAT router allows the local area network LAN to be declared in accordance with IP requirements as a private network, with the NAT router functionality in the customer premises equipment CPE ensuring translation into the respective currently assigned public IP address.

It should be pointed out that the first PPPoE-session ps1 to be set up between the subscriber and the decentralized communication device DSLAM within the framework of the proposed method does not have to be terminated in the customer premises equipment CPE—as shown in FIG. 1. As an alternative the first PPPoE session ps1 can also be terminated in one of the communication terminals STB, PC, IP connected via the LAN—not shown. In this case however the data stream imix transferred via the first PPPoE session is only usable by this terminating communication terminal STB, PC, IP.

This disadvantage could be overcome by a further protocol instance PPPoE for termination of the PPP or PPPoE protocol or session being arranged in the customer premises equipment CPE. With this further protocol instance PPPoE an additional PPPoE session psx is set up between the customer premises equipment CPE and the communication terminal, for example the personal computer PC—see FIG. 1B. Within the framework of the proposed method the role of a "man-in-the-middle" is likewise executed by the customer premises equipment CPE, with it being possible for other communication terminals arranged in the LAN to also use the additional PPPoE session psx, i.e. via the PPPoE instance arranged in the CPE terminating through to the connected communication terminals information can be transmitted from/to the further communication terminals—here set top box STB and IP phone IP, without this being evident to the personal computer terminating the additional PPPoE session psx.

As already explained, two protocol instances for termination of the PPPoE protocol are provided within the framework of the proposed method in the decentralized communication device DSLAM. The decentralized communication device DSLAM can in this case be configured both for execution of the function of a PPPoE relay and also the function of a PPPoE proxy. FIG. 2 shows the protocol layer structure required for the functionality as PPPoE proxy. In the functionality as PPPoE proxy, as can be seen from FIG. 2, with the PPPoE data packets arriving at the decentralized communication device DSLAM the respective PPP and also Ethernet data frame is removed and pure data packets are processed by the decentralized communication device DSLAM, which are subsequently inserted back into the PPPoE data frame. This makes it easy to process the data packets, in particular a more precise analysis of the information contained in the data packets such as for example the evaluation of IGMP data packets or IGMP information, is possible.

Figure 3:
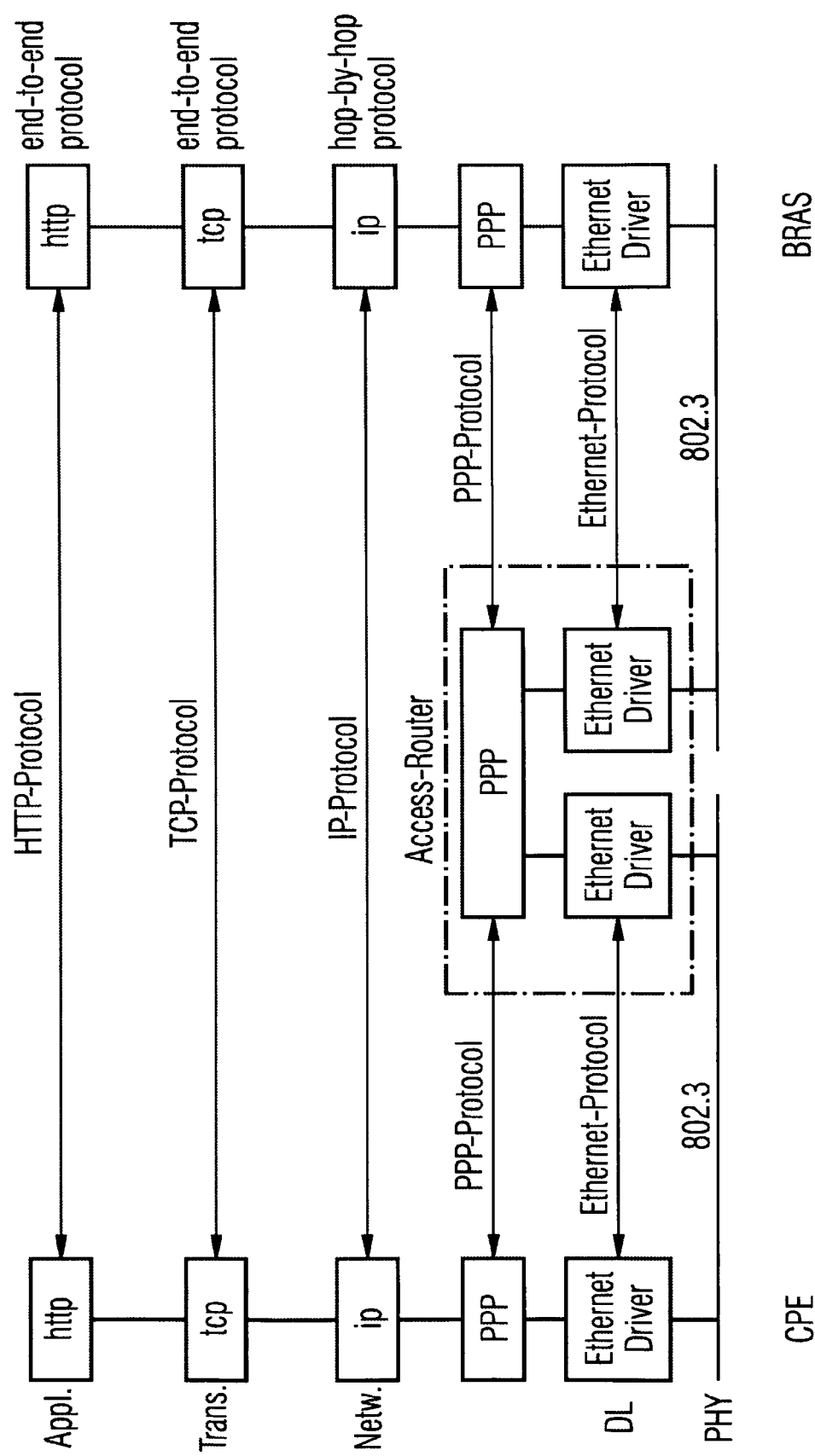
FIG. 3 shows the protocol stack required for executing the proposed method in a further embodiment variant.

FIG. 3. shows the protocol layer structure required for functionality as PPPoE relay. Within the framework of this functionality as PPPoE relay PPPoE data packets arriving at the decentralized communication device DSLAM are forwarded transparently, i.e. without manipulation, between the individual PPPoE protocol instances PPPoE.

In the PPPoE proxy variant (see also FIG. 2) the PPPoE packets of the first PPPoE session ps1 are terminated by the subscriber, but then almost with entirely the same content are forwarded as second PPPoE sessions ps2 between the decentralized communication device DSLAM in the direction of the BRAS. However in this case basic changes and manipulations are conceivable and possible to specific parts of the packets of the session ps1.

In the PPPoE relay variant (see also FIG. 3) the PPPoE packets of the sessions ps1 are forwarded unchanged and if possible without actual knowledge of the meaning as packets of the session ps2. For injection of the multicast traffic only a relatively simple analysis in accordance with specific bit patterns is necessary, which gives the necessary reference to the multicast signaling protocol IGMP.

As already explained the PPPoE session set up between subscriber TLN and BRAS is terminated in the decentralized communication device DKE both in the direction of BRAS as also in the direction of subscriber TLN. This means the Ethernet MAC (Medium Access Control) layer is also terminated in the corresponding manner in the decentralized communication device DSLAM. A MAC address translation functionality can advantageously be implemented in the decentralized communication device DSLAM by the termination of the Ethernet MAC layer. This service is also referred to as CEBS (Carrier Ethernet Border Switch). A translation of MAC addresses can be undertaken within the framework of CEBS. The translation of the MAC address made possible within the framework of CEBS enables different MAC addresses to be used on the subscriber side TLN and in the aggregation network AGG, in which case hardware outlay can be minimized.

As already described, multimedia data stored in the video servers VSERV can be transmitted by the broadcast or multicast transmission method to the decentralized communication device DSLAM. For control of the broadcast or multicast data stream icast IGMP data packets are exchanged for example between the subscriber side TLN and the video server VSERV. Alternatively the IGMP data packets can also be transmitted via the BRAS to the video server. The subscriber-side selection of a specific TV channel can be controlled within the framework of the IGMP protocol for example. Within the framework of the proposed method it is necessary for the multiplexer MUX arranged in the decentralized communication device DSLAM to receive information pertaining the video information which has been requested by the respective subscriber. A plurality of embodiment variants of the decentralized communication device DSLAM in relation to IGMP are known.

In accordance with a first embodiment variant the subscriber-side IGMP data packets sent out are transmitted transparently via the decentralized communication device DSLAM in the direction of the BRAS or video server VSERV. This means that initially it is not possible for the multiplexer MUX arranged in the decentralized communication device DSLAM to tell, or this device initially has no relevant information, as to the information which has been requested by the respective subscriber. In order to still provide the respective decentralized communication device DSLAM or the multiplexer arranged within it with information pertaining to the multimedia data which has been requested by the respective subscriber from the video server VSERV, a device IGMP is arranged in the decentralized communication device DSLAM by which transparently transferred IGMP data packets are read and evaluated by IGMP snooping. IGMP requests can be captured by IGMP snooping and can be evaluated in respect of which video information or which TV channels will be requested by the respective subscriber. Depending on this information the multimedia data icast requested in each case and transferred to the decentralized communication device DSLAM by broadcast or multicast is appropriately selected by the multiplexer arranged in the decentralized communication device BKE, inserted via the PPPoE session ps1 arranged between customer premises equipment CPE and decentralized communication device DSLAM and transmitted to the respective subscriber.

In accordance with an alternate embodiment variant the IGMP protocol will be terminated in the decentralized communication device DSLAM, whereby the multiplexer MUX arranged in the decentralized communication device DSLAM obtains the required information for the selected requested video information without further outlay.

Figure 4A:
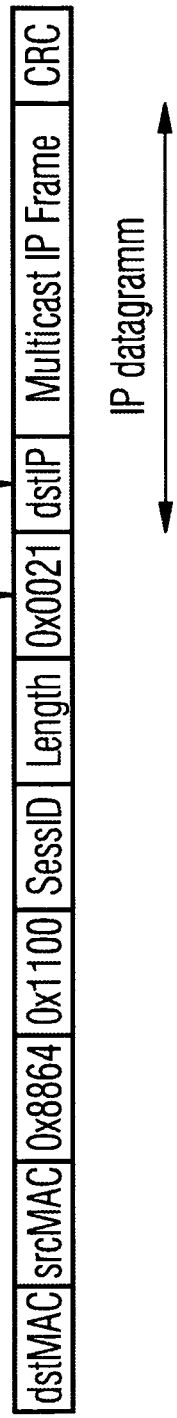
FIG. 4 shows a schematic diagram of the embedding of IGMP protocol elements into PPPoE data frames.

FIG. 4A shows a typical PPPoE data frame with embedded IGMP data packet, with the identification of the IGMP data packets being possible within the framework of IGMP snooping on the basis of identification code 0x0021 and the destination IP address (here 224.0.0.2).

Figure 4B:
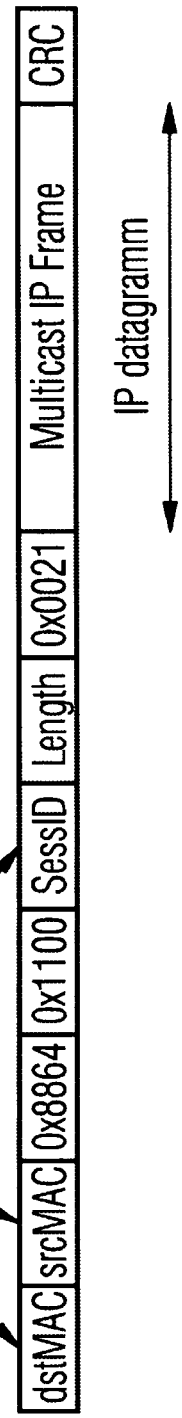

FIG. 4B shows within the framework of IGMP snooping possible derivation of further information which is required for identifying the subscriber TLN requesting the video information (here srcMAC), of the video servers (here dstMAC) as well as the requested information (sessID).

It can occur that a BRAS administered by an Internet service provider (ISP) fails. in this case no PPPoE session ps2 can be set up between the decentralized communication device DSLAM and the BRAS.

This can have lasting effects on a TV broadcast service, which for example is offered by the network operator of a subscriber access ACCESS or by a Network Access Provider (NAP). A NAP will naturally not accept any negative influence on service from the ISP side. This problem can however be resolved by the decentralized communication device DSLAM. The decentralized communication device DSLAM only has to be configured such that even in the event of the PPPoE session ps2 between the decentralized communication device and the BRAS failing, a PPPoE session ps1 between the subscriber TLN and the decentralized communication device DSLAM is still set up. This can be achieved for example by the network operator of the subscriber access network temporarily assigning dummy IP addresses (for example an IP address declaring a private network) to the respective subscriber TLN.

Some Internet Service Providers or ISPs restrict the lifetime of temporally allocated IP addresses to a period of 24 hours for example. After this lifetime has elapsed the PPPoE session is cleared down, so that a new PPPoE session ps1 has to be established by the customer premises equipment CPE, which makes the allocation of a new public dynamic IP address necessary. As a consequence of this reallocation of this IP address the TV broadcast service of the Network Access Provider NAP running in parallel via PPPoE session ps1 is interrupted for a few seconds for example. This problem can advantageously be surmounted by the respective decentralized communication device DSLAM clearing down the PPPoE session ps1 to the subscriber at a point in time when no multimedia data or TV broadcast service is being transferred via the PPPoE session ps1. In this way an interruption of for example an important TV show can be avoided.

Within the framework of the proposed method, bidirectional PPPoE sessions and multicast or broadcast data traffic are merged and transmitted via an individual PPPoE session to the respective subscriber. The proposed approach of the "man-in-the-middle", i.e. the termination of the PPPoE session on both sides in the local communication unit, is transparent for the communication devices involved in the exchange of information (e.g. set top box, personal computer and also video server, TV server and network access unit BRAS. The transparency means that a change of the defined protocol execution sequences is not required, meaning that the technical and thus also the financial outlay for executing the proposed method can be kept low.

Figure 5:
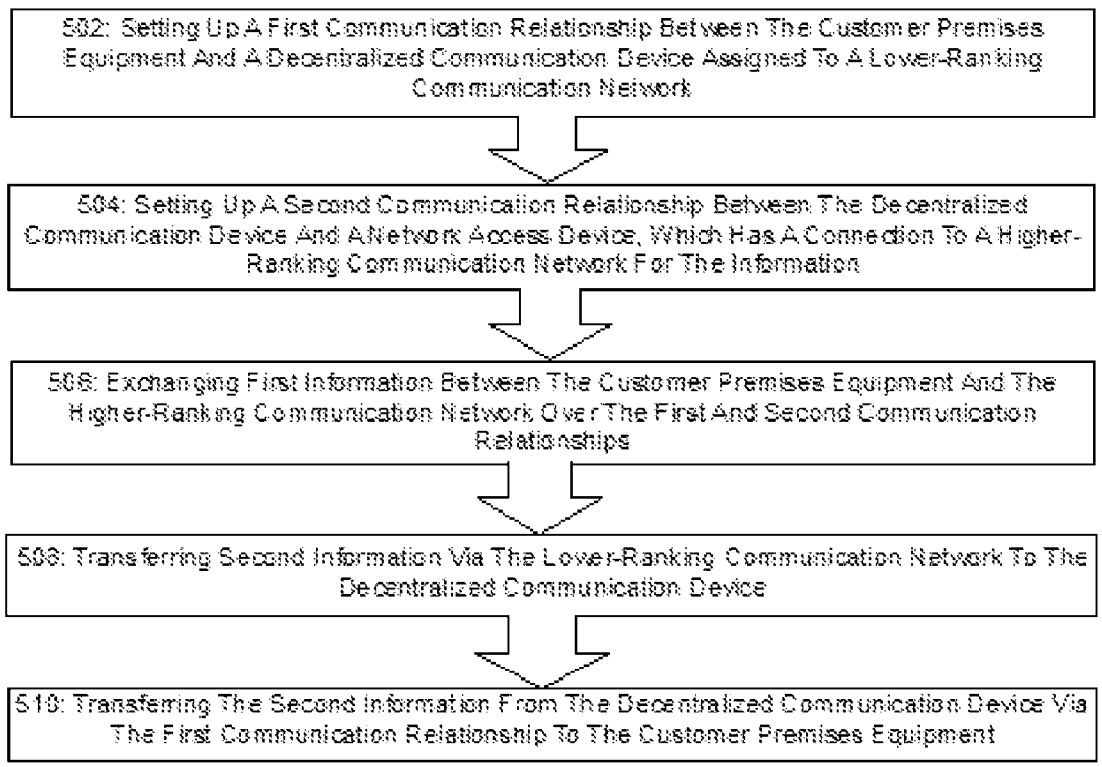
FIG. 5 shows a method for transmitting information from and/or to customer premises equipment.

In FIG. 5 is shown a method for transmitting information from and/or to a subscriber-side communication device. In a first operation 502, at least one first communication relationship between the subscriber-side communication device and a decentralized communication device assigned to at least one communication network is configured. In a second operation 504, at least one further communication relationship is set up between the decentralized communication device and a network access device implementing the connection to a higher-ranking communication network. In a third operation 506, first information is exchanged between the subscriber-side communication device and the higher-ranking communication network via the at least one first and the at least one further communication relationship. In a fourth operation 508, information is transferred via the at least one communication network to the decentralized communication device. In a fifth operation 510, information is transferred to the subscriber-side communication device in addition to the first information about the at least one first communication relationship.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for supporting multicast services or broadcast services, said method being performed in a decentralized communication device connected to a network access device, a Multicast-Server or Broadcast-Server and at least one of a customer premises equipment; said method comprising the following steps:
   receiving a request from a customer premises equipment, said request being a request for a Point-to-Point Protocol over Ethernet (PPPoE) session between the customer premises equipment and a network access device;
   capturing said request to generate a first PPPoE session between the customer premises equipment and the decentralized communication device and a second PPPoE session between the decentralized communication device and the network access device;
   linking said first and second PPPoE session such that data packets are forwarded transparently from the first session to the second session and vice versa;
   analyzing control data packets received from the customer premises equipment and addressed to the network access device or to the Multicast-Server or Broadcast-Server in order to evaluate information used by a subscriber of the customer premises equipment to select particular multicast traffic or broadcast traffic;
   forwarding said control data packets via said second PPPoE session to the network access device or to the Multicast-Server or Broadcast-Server; and
   injecting the particular multicast traffic or broadcast traffic selected by the subscriber of the customer premises equipment into the first PPPoE session.

2. The method as claimed in claim 1, wherein said multicast traffic is transmitted with a multicast transmission method to the decentralized communication device.

3. The method as claimed in claim 1, wherein the access network is an Internet Protocol network.

4. The method as claimed in claim 1, wherein communication terminals are connected to the customer premises equipment, and the customer premises equipment comprises a distribution device for distributing second information to the communication terminals connected to the customer premises equipment.

5. The method as claimed in claim 1, wherein the customer premises equipment is a communication terminal.

6. The method as claimed in claim 1, wherein the control data packets are data packets according to an Internet Group Management Protocol (IGMP).

7. The method as claimed in claim 1, wherein a communication terminal is connected to the customer premises equipment, and a third PPPoE session is set up between the customer premises equipment and the communication terminal.

8. The method as claimed in claim 7, wherein the access network is an Internet Protocol network.

9. The method as claimed in claim 8, wherein communication terminals are connected to the customer premises equipment, and the customer premises equipment comprises a distribution device for distributing the second information to the communication terminals connected to the customer premises equipment.

10. The method as claimed in claim 9, wherein the selection information is transmitted according to an Internet Group Management Protocol (IGMP).

11. The method as claimed in claim 10, wherein a communication terminal is connected to the customer premises equipment, and a third PPPoE session is set up between the customer premises equipment and the communication terminal.

12. A network device connectable to a network access device, a Multicast-Server or Broadcast-Server and at least one of a customer premises equipment, comprising:
   means for receiving, from the customer premises equipment, a request for a PPPoE session between the customer premises equipment and the network access device;
   means for capturing said request to generate a first PPPoE session between the customer premises equipment and the network device and a second PPPoE session between the network device and the network access device;
   means for linking said first and second PPPoE session such that data packets are forwarded transparently from the first session to the second session and vice versa;
   means for capturing control data packets received via said first PPPoE session, said control data packets comprising information for controlling multicast traffic or broadcast traffic and
   means for analyzing said captured control data packets in order to evaluate information used by a subscriber of the customer premises equipment to select particular broadcast traffic or multicast traffic
   means for forwarding said control data packets via said second PPPoE session to the network access device or to the Multicast-Server or Broadcast-Server; and means for injecting the particular multicast traffic or broadcast traffic selected by the subscriber of the customer premises equipment into the first PPPoE session.

13. A network device as claimed in claim 12, wherein said requests for controlling a multicast session (IGMP requests) are captured by snooping or by terminating the IGMP protocol.

\* \* \* \* \*